United States Patent [19]

Watanabe et al.

[11] Patent Number: 5,150,239
[45] Date of Patent: Sep. 22, 1992

[54] ONE-PACK TYPE EPOXY SEALANT WITH AMINE-TYPE CURING AGENT, FOR LIQUID CRYSTAL CELL, DISPLAY APPARATUS AND RECORDING APPARATUS

[75] Inventors: Yasuyuki Watanabe, Chigasaki; Masayuki Shimamune, Tokyo; Masaaki Suzuki, Yokohama, all of Japan

[73] Assignee: Canon Kabushiki Kaisha, Tokyo, Japan

[21] Appl. No.: 652,661

[22] Filed: Feb. 8, 1991

[30] Foreign Application Priority Data

Feb. 9, 1990 [JP] Japan .................... 2-028496
Feb. 5, 1991 [JP] Japan .................... 3-035252

[51] Int. Cl.$^5$ ............................ G02F 1/1339
[52] U.S. Cl. ........................ 359/80; 359/81
[58] Field of Search ............ 350/343, 344; 359/80, 359/81

[56] References Cited

U.S. PATENT DOCUMENTS

| 4,589,732 | 5/1986 | Shiraishi et al. | 350/332 |
| 4,695,490 | 9/1987 | McClelland et al. | 350/343 |
| 4,973,138 | 11/1990 | Yamazaki et al. | 350/344 |
| 4,989,955 | 2/1991 | Ito et al. | 350/344 |

FOREIGN PATENT DOCUMENTS

| 0050535 | 4/1979 | Japan. | |
| 0050223 | 4/1980 | Japan | 359/80 |
| 0032419 | 2/1982 | Japan | 359/80 |
| 0058125 | 4/1982 | Japan | 359/80 |
| 59-126511 | 7/1984 | Japan. | |
| 0018523 | 1/1987 | Japan. | |
| 62-174284 | 7/1987 | Japan. | |
| 62-174726 | 7/1987 | Japan. | |
| 2183073 | 5/1987 | United Kingdom | 350/343 |

OTHER PUBLICATIONS

Mark, Encyclopedia of Polymer Science and Engineering, vol. 6 (1987) 350:1.

Primary Examiner—Stanley D. Miller
Assistant Examiner—Anita Pellman Gross
Attorney, Agent, or Firm—Fitzpatrick, Cella, Harper & Scinto

[57] ABSTRACT

A liquid crystal cell is prepared by bonding a pair of oppositely disposed electrode plates with a sealant of a one-pack type epoxy adhesive to define a space to be filled with a liquid crystal. In advance of the use, the one-pack type epoxy adhesive is modified with an amine-type room temperature hardener to selectively reduce a low-molecular weight fraction in the epoxy adhesive so as to avoid a sealant flow at an elevated temperature. This is particularly advantageous when the sealant is used in combination with a particulate adhesive which is disposed in the liquid crystal space and activated at such an elevated temperature to bond the electrode plates while keeping an accurate gap between the electrode plates.

13 Claims, 6 Drawing Sheets

ONE-PACK TYPE EPOXY SEALANT WITH AMINE-TYPE CURING AGENT, FOR LIQUID CRYSTAL CELL, DISPLAY APPARATUS AND RECORDING APPARATUS

FIELD OF THE INVENTION AND RELATED ART

The present invention relates to a sealant for bonding substrates, particularly a sealant for liquid crystal cells for boding a pair of opposite electrode plates of a liquid crystal cell which may be loaded in a display apparatus or a recording apparatus.

A one-pack type or single-liquid type epoxy resin adhesive has been conventionally used as an adhesive for constituting a sealant for liquid crystal cells, because of its high strength and excellent heat resistance, chemical resistance and moisture resistance, etc.

For example, Japanese Laid-Open Patent Application (JP-A) Sho 59-126511 (assigned to Mitsui Toatsu Kabushiki Kaisha) discloses a one-pack type epoxy resin adhesive which comprises (a) an epoxy resin, (b) a hydrazide compound having a hydrazide group as a potential hardener, (c) a filler, and optionally (d) a solvent. It is also disclosed that the adhesive may be used for production of a liquid crystal cell.

In a conventional liquid crystal cell production process using such a one-pack type epoxy resin adhesive, a sealant comprising the adhesive is applied generally by printing onto at least one of a pair of substrates, and then the pair of substrates superposed in alignment with each other, followed by pressure bonding. The pressure bonding is effected for pressing the sealant to provide the entire panel uniformly with a prescribed gap and for fixing the alignment of the pair of substrates.

The sealant used in this instance is required of the following properties (1)–(3) in combination:

(1) a viscosity appropriate for printing;
(2) an appropriate tackiness to the substrates; and
(3) a sufficiently high viscosity so that it does not flow at the time of the pressure bonding or the substrates are not moved from each other. The above properties (1) and (3) are generally contradictory to each other.

Figure 3:
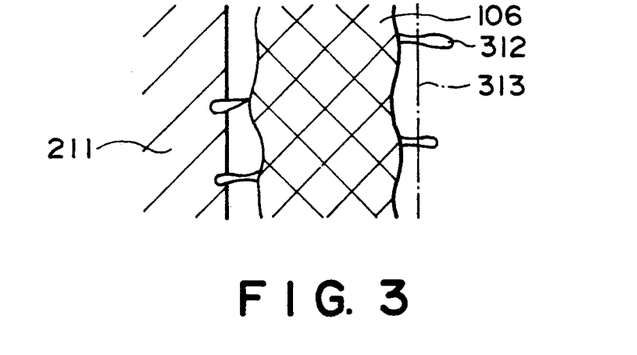
FIG. 3 is an illustration of a sealant flow.

FIG. 3 is an illustration of sealant flow wherein a sealant 106 applied between a display area 211 and a scribe line 313 at which the substrates have been cut, has caused a sealant flow-out 312. Such a sealant flow is especially frequently encountered where such a one-pack type epoxy resin is not used, because the above property (3) is lacked, thus resulting in failure of increase in production yield and higher resolution.

In the case of using a one-pack type epoxy adhesive, a latent or potential hardener contained therein is activated generally at 120° C. or higher to promote the curing, so that the adhesive can be diluted with a solvent to allow a relatively wide viscosity adjustment and also the solvent can be dried under heating at a temperature below the activation temperature. Accordingly, the above required properties (1) and (3) have been satisfied simultaneously, so that the problems of sealant flow and alignment failure at the time of pressure bonding and curing have been solved.

Such a one-pack type epoxy adhesive is accompanied with a change in printing characteristic depending on the selection of a diluting solvent and a dilution ratio. For example, it has been possible to use a batch of adhesive for a long time of continuous operation if the printing characteristic is stabilized by using a solvent having a higher boiling point at a higher proportion.

However, the use of such a one-pack type epoxy adhesive is not always satisfactory in view of recent requirements for a larger area, a higher resolution and a higher drive speed of a panel (liquid crystal cell). For these requirements, an STN (super twisted nematic) liquid crystal device and an FLC (ferroelectric liquid crystal) device requiring a smaller gap of 5-6 microns and 1-2 microns, respectively, have been developed. In these devices, such a small gap is required to be maintained with a tolerance of 0.05-0.10 micron over a wide area. Accordingly, it has been required to uniformly disperse spacers and maintain the distribution of the spacers for a long time and also to fix the pair of substrates to each other with a constant gap over the entire extension of the panel by bonding the substrates at points and secure the gap between the substrates provided under pressure bonding For such bonding between a pair of substrates, it is most practical at present to use a hot melt type particulate adhesive in view of wide applicability to general usages and little influence on display quality. For optimization of the production process, it is further desirable to soften the particulate adhesive under heating for providing a prescribed gap simultaneously with the pressure bonding of the sealant.

However, if the heating for the particulate adhesive is applied to the sealant of a conventional one-pack type epoxy adhesive under application of a pressure for providing a small gap of several microns, the above-mentioned sealant flow can occur to a practically non-acceptable level in some cases.

SUMMARY OF THE INVENTION

A principal object of the present invention is to provide a sealant which solves the above-mentioned problem of sealant flow even at a softening point of a particulate adhesive without impairing various advantages of a one-pack type epoxy adhesive.

According to a principal aspect of the present invention, there is provided a sealant for a liquid crystal cell wherein a pair of oppositely disposed electrode plates are bonded to each other with the sealant to define space to be filed with a liquid crystal, comprising a one-pack type thermosetting epoxy adhesive and an amine-type room temperature hardener modifying the epoxy adhesive.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
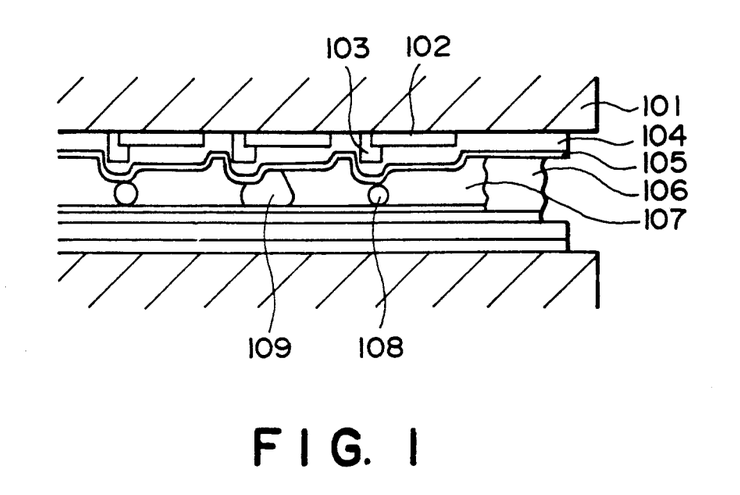
FIG. 1 is a sectional view of a liquid crystal cell according to the present invention.

FIG. 1 is a schematic partial sectional view of a liquid crystal cell according to the present invention. Referring to FIG. 1, the liquid crystal cell comprises a pair of substrates 101 each having thereon transparent electrodes 102, metal wires (or electrodes) 103, an insulating layer 104 and an alignment film 105, a sealant 106 for bonding the pair of substrates, a liquid crystal 107, a spacer 108 for holding the thickness of the liquid crystal layer, and a particulate adhesive 109.

The sealant 106 according to the present invention comprises a one-pack type thermosetting epoxy adhesive, which in turn comprises an epoxy resin and a potential hardener.

The epoxy resin used in the present invention is a compound having two or more epoxy groups in its molecules. Examples thereof may include the following classes I-IV of compounds:

I. Polycondensation resins between active hydrogen-containing compounds inclusive of:
  (1) bisphenols, such as bisphenol A and bisphenol F,
  (2) hydroxy compounds, such as novolak resin formed by condensation between phenol or cresol and formaldehyde, tetrahydroxyphenylmethane, and resorcinol,
  (3) amine compounds, such as diaminodiphenyl methane, aniline and xylenediamine,
  (4) polyhydric alcohols, such as glycerin and pentaerythritol, and
  (5) carboxy compounds, such as phthalic acid and hexahydrophthalic acid; and epihalohydrins, such as epichlorohydrin and epibromohydrin, or methylepihalohydrins, such as methylepichlorohydrin; and halogenated products of the polycondensation resins;

II. epoxidized aliphatic acids and derivatives thereof, such as epoxidized soybean oil;

III. epoxidized diene polymers, such as epoxidized polybutadiene, and epoxidized polyisoprene; and IV. aliphatic epoxy resins, such as 3,4-epoxy-6-methylcyclohexylmethyl 3,4-epoxy-6-methylcyclohexanecarbonate, vinylcyclohexene diepoxide, and bis(2,3-epoxycyclopentyl) ether. These epoxy resins may be used singly or in mixture of two or more species and may have a number-average molecular weight of 300-1500 (corresponding to that of polystyrene based on GPC (gel permeation chromatography)). Particularly suitable epoxy resins may be those belonging to the Class I, particularly those derived from the compounds of (1)-(3).

In case where two or more species of epoxy resins are used, it is sufficient that they have averagely a number-average molecular weight of 300-500. The reason for the definition of a number-average molecular weight of 300-1500 (before the addition of the room temperature hardener) is as follows. Thus, an average molecular weight of below 300 results in a poor adhesiveness with cell-constituting materials, thus failing to provide sufficient physical and chemical stabilities, and also results in an insufficient heat resistance. On the other hand, an average molecular weight of over 1500 results in a poor adhesiveness or tackiness after pre-drying, thus leading to a difficulty that the cell substrate and member to be bonded thereto superposed on each other after pre-drying are liable to change their relative positions due to external impact, vibration, etc. A particularly preferred range of the average molecular weight of the epoxy resin is 400-800.

The potential hardener to be used in the present invention may be a hardener for an epoxy resin which may be activated at 100°-140° C., desirably 110°-130° C., most suitably at 120°-125° C. The potential hardener may preferably be a hydrazide compound, examples of which may include: mono-basic acid hydrazides, such as salicylohydrazide, p-oxybenzohydrazide and phenylaminopropionohydrazide; and dibasic acid dihydrazides, such as succinohydrazide, adipinodihydrazide isophthalodihydrazide, dodecanodihydrazide, sebacodihydrazide, thiodipropionohydrazide, furandicarbodihydrazide, and cyclohexanecarbodihydrazide. Among these, dibasic acid dihydrazides are particularly preferred. These hydrazide compounds may be used singly or in mixture of two or more species.

The hydrazide compound functions as a hardener for an epoxy resin and, when mixed with an epoxy resin, provides a mixture having a long shelf life at room temperature, which can be used as a one-pack type epoxy resin adhesive. Further, compared with other hardeners usable in one-pack type epoxy resin adhesives, such as dicyanodiamide and $BF_3$ compounds, initiates the hardening reaction at a relatively low temperature and also has an effect of imparting extremely high heat resistance, low-temperature characteristic and water resistance. It is also advantageous that no electrically harmful substance is generated therefrom.

The potential hardener, particularly a hydrazide compound, may be used in an amount of providing 0.15-0.35 mol of hydrazide group for 1 mol of epoxy group in the epoxy resin. If the amount is below 0.15 mol, an operational difficulty is encountered such that a long time is required for, and the electrical insulating characteristic of the resultant cell is liable to be insufficient. An amount of above 0.35 mol provides difficulties, in particular a lowering in moisture resistance. It is particularly preferred that the hydrazide is used in such an amount as to provide 0.2-0.25 mol of hydrazide group for 1 mol of epoxy group in the epoxy resin. The mixing of both compounds may preferably be effected by using a kneading means, such as a three-roll mill, capable of uniformly and finely dispersing the hydrazide which is generally solid.

The amine-type room temperature hardener used in the present invention may include: aliphatic polyamines, polyamide resins and isocyanate compounds which are generally used as a room temperature hardener (activatable at 20°-30° C.) for epoxy resins. Specific examples thereof may include: piperazine, ethylenediamine, diethylenetriamine, and triethylenetetramine. It is also possible to suitably use reaction products between modified or unmodified aliphatic amines and fatty acids, such as dimer acids polyamides.

The amine-type room temperature hardener is added so as to cause a selective reaction with a low-molecular weight fraction (having a molecular weight of 500 or less) of the epoxy resin in the sealant in advance to increase the molecular weight. Accordingly, it is preferred to add the amine-type room temperature hardener in a proportion of 0.2–0.8 equivalent, further preferably 0.25–0.5 equivalent, per one equivalent of the low-molecular weight fraction of epoxy resin in the sealant.

Further, it is preferred to add the amine-type room temperature hardener in a proportion of 1.0–3.0 wt. %, further preferably 1.8–3.0 wt. %, of the total of the hardener and the one-pack type thermosetting epoxy resin adhesive. A proportion of below 1.0 wt. % is insufficient to prevent the sealant flow. A proportion of above 3.0 wt. % results in a pot life which is too short for a practical production process.

The sealant according to the present invention can contain various fillers, examples of which may include:

(1) inorganic fillers inclusive of: carbonates, such as calcium carbonate and magnesium carbonate; sulfates, such as barium sulfate and magnesium sulfate; silicates, such as aluminum silicate and zirconium silicate; oxides, such as iron oxide, titanium oxide, aluminum oxide and zinc oxide; potassium titanate, kaolin, talc, asbestos powder, quartz powder, mica, and glass fiber; and (2) organic fillers inclusive of: polyethylene powder, polypropylene powder, polyester powder, polyvinyl chloride powder, polystyrene powder, polyvinyl acetate powder, polymethacrylate powder, polyurethane powder, polyester powder, urea resin powder, phenolic resin powder, benzoquanamin resin powder and epoxy resin powder.

Generally, the fillers may desirably be used in an amount of 1–100 wt. parts per 100 wt. parts of the epoxy resin while the addition amount can remarkably vary depending on the sealant composition, particularly the kind of the filler per se.

In general, filler amount of less than 1 wt. part is liable to result in difficulties, such as poor application or printing characteristic and poor retentivity of the applied pattern. A filler amount of more than 100 wt. parts is liable to cause difficulties in application, e.g., by screen printing. The mixing of the filler may preferably be effected by using a kneading means, such as a three-roll mill, for communication so as to prevent clogging of a screen for screen printing, etc.

In the present invention, the sealant or adhesive may preferably contain a solvent, which may desirably have a boiling point of 70°–250° C. Examples of such a solvent may include: hydrocarbons, such as n-heptane, n-octane, n-decane, cyclohexane, benzene, toluene, xylene, ethylbenzene, diethylbenzene, amylbenzene, naphthalene and pinene; halogenated hydrocarbons, such as carbon tetrachloride, ethylene chloride, 1,1,1-trichloroethane, 1,1,1,2-tetrachloroethane, hexachloroethane, hexachloroethane, trichloroethylene, tetrachloroethylene, 1,2,3-trichloropropane, butyl chloride, amyl chloride, 2-ethylhexyl chloride, ethylene bromide, tetrabromoethane, chlorobenzene, 1,2,4-trichlorobenzene, and bromobenzene; alcohols, such as ethanol, isopropanol, n-amyl alcohol, fusel oil, n-hexanol, methylamyl alcohol, 2-ethylbutanol, n-heptanol, n-octanol, n-decanol, cyclohexanol, benzyl alcohol and furfuryl alcohol; ethers and acetals, such as n-butyl ether, n-hexyl ether, ethyl phenyl ether, 1,4-dioxane, trioxane and diethyl acetal; esters, such as propyl formate, isobutyl formate, ethyl acetate, n-butyl acetate, benzyl acetate, isoamyl butylate, ethyl lactate, methyl benxoate and diethyl oxalate; polyhydric alcohols and derivatives thereof, such as ethylene glycol, methyl cellosolve, methyl cellosolve acetate, cellosolve acetate, dibutyl cellosolve, methyl carbitol, carbitol acetate, butyl carbitol, propylene glycol and hexylene glycol; ion-containing solvents, such as dimethyl sulfoxide, and nitrogen-containing solvents, such as N,N-dimethylformamide.

If the solvent has a boiling point of below 70° C., the solvent is liable to be evaporated to increase the viscosity of the adhesive containing the solvent during the storage or application operation of the adhesive, whereby the processability of the adhesive is impaired. A solvent having a boiling point of above 250° C. requires a long time for the pre-drying step and is liable to remain in the adhesive after the application, whereby the performance of the liquid crystal in the cell can be impaired or the adhesion performance can be deteriorated thereby.

Such a solvent is desirably used in the present invention so as to provide the adhesive with an appropriate fluidity and an appropriate applicability. The amount of the solvent is selected so as to be adopted to these purposes and may suitably be in the range of 0–70 wt. parts per 100 wt. parts of the epoxy resin in general. The solvent may be used singly or in mixture of two or more species.

The above-mentioned components of the sealant including the epoxy resin, potential hardener, room temperature hardener, filler, solvent and other optional additives can be mixed in an arbitrary order provided that they can be sufficiently mixed and the room temperature hardener is added in a rather late stage so as to provide an appropriate length of pot life.

The particulate adhesive 109 to be used in combination with the sealant according to the present invention may for example comprise epoxy resin particles having an average particle diameter of 0.3–500 microns and containing a potential hardener (as disclosed in, e.g., Japanese Laid-Open Patent Applications (JP-A) Sho 62-174726 and Sho 62-174284). The potential hardener may for example be an addition product between diglycidyl ethers of bisphenols or condensation products thereof and polyhydric phenol compounds.

As described hereinbefore, when a conventional sealant is used and the heating of a particulate adhesive is performed simultaneously with pressure bonding of the sealant, the problem of a sealant flow is encountered. This is considered because, when the substrate are entirely heated to a softening temperature of the particulate adhesive simultaneously with the pressure bonding of the sealant, a relatively fluid low-molecular weight portion of the sealant which is also caused to assume a lower viscosity as a whole is separated by flowing from the mass of the sealant under the application of the pressure and due to a preferential decrease in surface tension. In the present invention, however, such a low-molecular weight portion of the epoxy resin is selectively reacted in advance, i.e., the one-pack type thermosetting epoxy adhesive is modified with an amine-type room temperature hardener, before use of the adhesive, so that the adhesion is effected without such a sealant flow even when the sealant is heated to a softening temperature of the particulate adhesive at the time of pressure bonding.

Hereinafter, the present invention will be explained based on actual examples of cell preparation.

EXAMPLE 1

Figure 5:
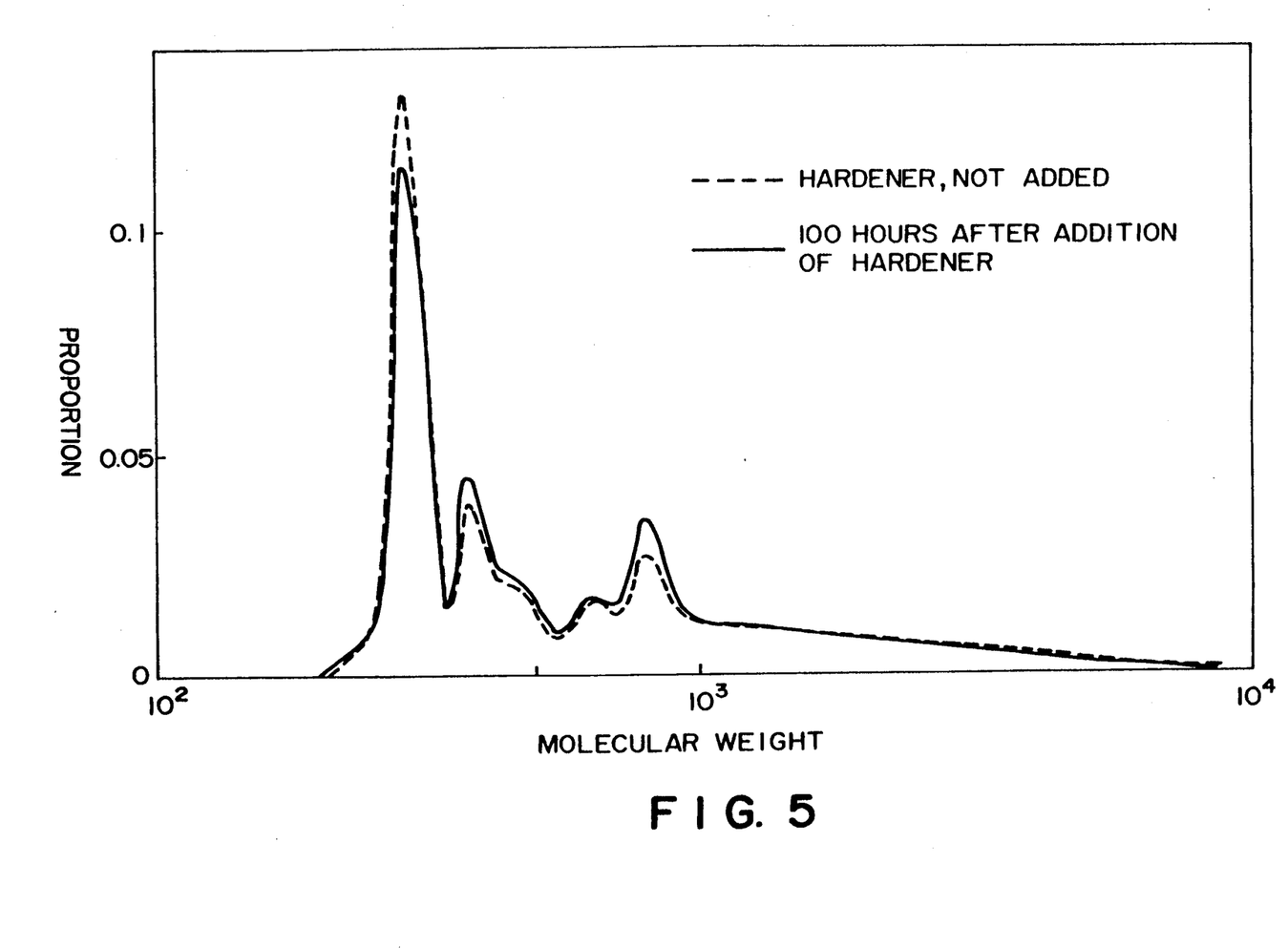
FIG. 5 is a chart showing a variation in molecular weight distribution by addition of a room temperature hardener.

A one-pack type thermosetting epoxy adhesive (trade name: STRUCT BOND XN-21F, 300 poise (25° C.), mfd. by Mitsui Toatsu Kagaku K.K.) was sufficiently mixed with an amine-type room temperature hardener (trade name: X-705, mfd. by Mitsui Toatsu Kagaku K.K.) in an amount of 2 wt. % of the total of the adhesive and the hardener and the mixture was left standing in a sealed state at 20°–25° C. for 100 hours. The thus treated mixture sample (sealant) was subjected to measurement of molecular weight distribution by GPC (gel permeation chromatography) using an apparatus (trade name: Model 150C mfd. by Waters Co.) The GPC chart of the sample thus obtained is shown in FIG. 5 along with that of the epoxy adhesive before the modification with the amine-type room temperature hardener. FIG. 5 clearly shows a selective decrease in amount of the low-molecular weight fraction.

Figure 4:
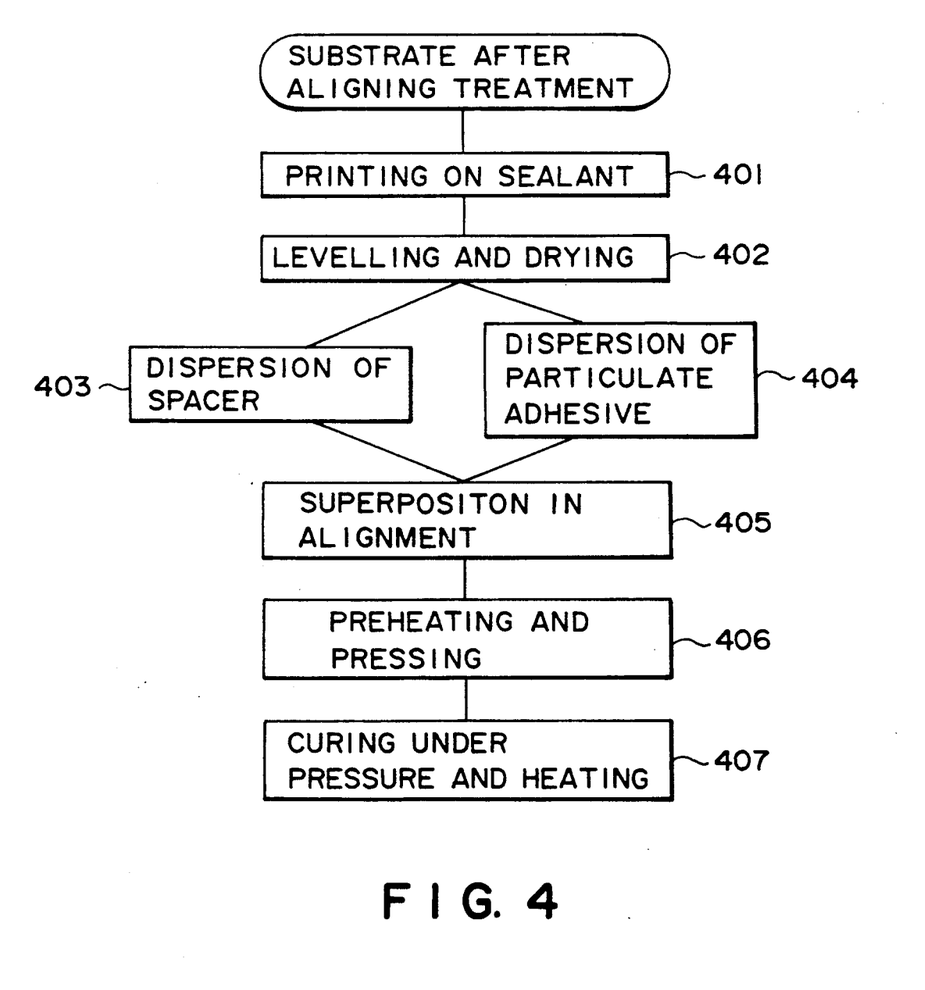
FIG. 4 is a flow chart for production of a liquid crystal cell.

Then, a cell was prepared according to a process as illustrated in FIG. 4.

Figure 2:
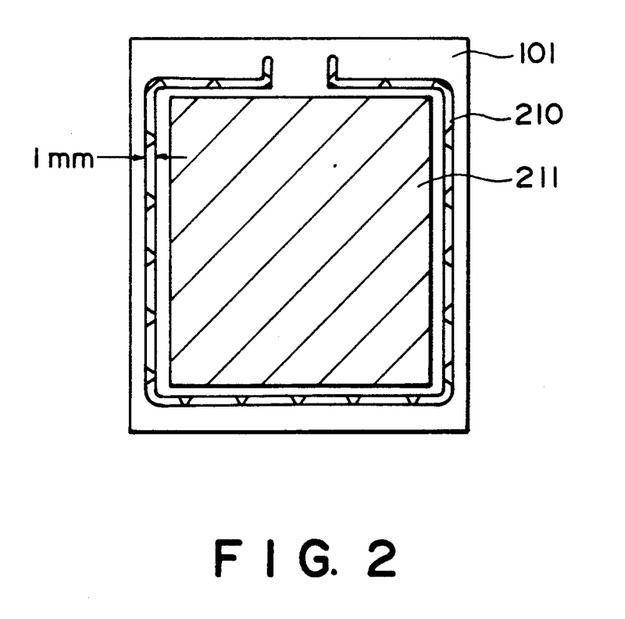
FIG. 2 is a plan view showing a printing pattern of a sealant.

More specifically, referring to FIG. 2, on one of a pair of 1.1 mm-thick glass substrates 101 already subjected to aligning treatment, a diluted adhesive (36 poise at 25° C.) obtained by mixing the above-prepared sample adhesive with methyl carbitol as a solvent in a ratio of 6:1 (sample:solvent) was applied in a prescribed pattern 210 having an average width of 1 mm and an average height of 3–5 microns (step 401) so as to surround a square display area 211 (having a diagonal size of 15 inches) and then subjected to leveling and drying at 90° C. for 5 min. on a hot plate (step 402).

Then, on one side of the one substrate thus treated, spacer beads (trade name: Silica Microbeads, mfd. by Shokubai Kasei K.K.) were dispersed at a rate of $300\pm100$ beads/mm$^2$, and on the other substrate, adhesive particles (trade name: Torepearl, mfd. by Toray K.K.) were dispersed at a rate of $35\pm5$ particles/mm$^2$. Then, the thus substrates were superposed with each other (steps 403–405).

The superposed structure was pre-heated at 70° C.$\pm7°$ C. for 5 min. under a pressure of $560\pm40$ g/cm$^2$, then supplied with a pressure of $2300\pm40$ g/cm$^2$ for 2 min. (step 406) and then subjected to curing under pressure and heating at 630 g/cm$^2$ and 150° C. for more than 30 min. (step 403) to prepare a blank liquid crystal cell, whereby the sealant was sufficiently pressure-bonded without causing sealant flow to provide a uniform gap in the display area of $1.37\pm0.05$ micron.

COMPARATIVE EXAMPLE 1

A blank liquid crystal cell was prepared in the same manner as in Example 1 except that the amine-type hardener was not added whereby a part of the sealant caused flowing-out.

EXAMPLE 2

A blank liquid crystal cell was prepared in the same manner as in Example 1 except that the mixture of the epoxy adhesive and the amine-type hardener was left standing for 300 hours instead of 100 hours, whereby the sealant was sufficiently pressure-bonded without causing sealant flow to provide a uniform gap in the display area of $1.37\pm0.05$ micron.

COMPARATIVE EXAMPLE 2

A blank liquid crystal cell was prepared in the same manner as in Example 1 except that the mixture of the epoxy adhesive and the amine-type hardener was left standing for 80 hours instead of 100 hours, whereby a part of the sealant caused flowing-out.

COMPARATIVE EXAMPLE 3

A blank liquid crystal cell was prepared in the same manner as in Example 1 except that the mixture of the epoxy adhesive and the amine-type hardener was left standing for 400 hours instead of 100 hours, whereby the sealant was not sufficiently deformed to result in an insufficient bonding between the substrates.

EXAMPLE 3

A blank liquid crystal cell was prepared in the same manner as in Example 1 except that the mixture of the epoxy adhesive and the amine-type hardener was left standing for 90 hours and then diluted with methyl carbitol as a solvent in a ratio of 3:1 (=mixture: solvent) to provide a diluted adhesive (sealant) having a viscosity of 12 poise at 25° C. The cell was prepared without causing sealant flow, and in this case, the printing of the sealant was stably and continuously effected at a rate of 4 or more times as fast as that in Example 1.

Next, some embodiments are explained for explaining application of a liquid crystal cell according to the present invention to a display apparatus and a recording apparatus.

Figure 6:
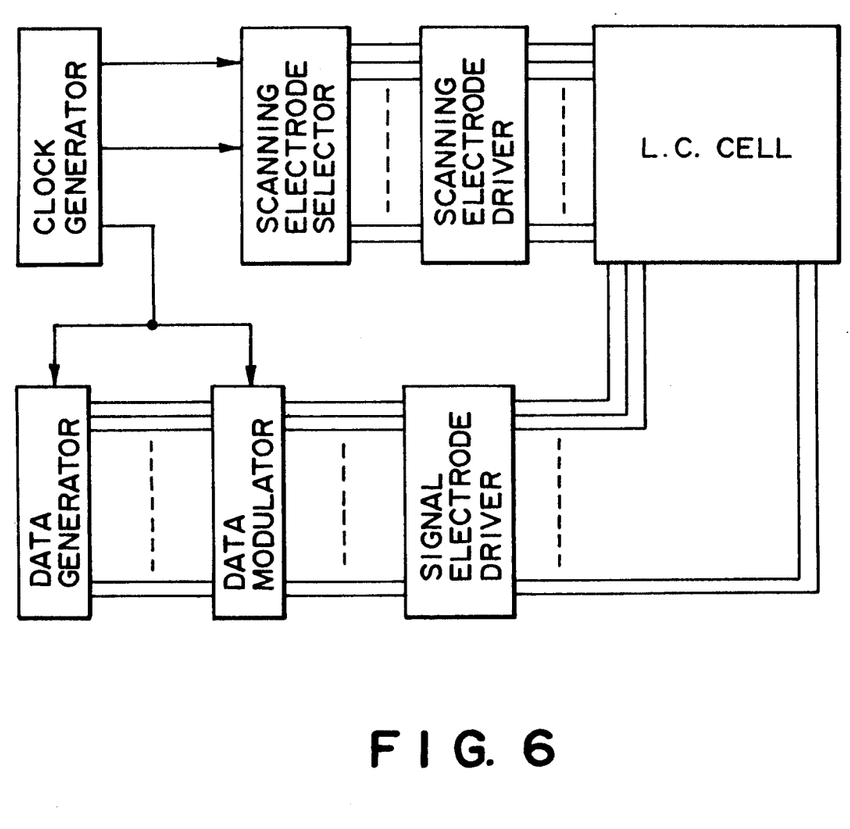
FIG. 6 is a block diagram of an example of a drive system for a liquid crystal cell according to the present invention.

FIG. 6 is a block diagram showing principally an electrical system of a display apparatus incorporating a liquid crystal cell according to the present invention Signals applied to the scanning electrodes are formed by sending a clock signal (CS) generally by a clock signal generator to a scanning electrode selector for selecting a scanning electrode and then to a scanning electrode driver. On the other hand, signals (DM) for the data electrodes are supplied to a data electrode driver through a data modulator where data signals and an auxiliary signal are formed from output signals (DS) from a data generator and a clock signal (CS).

Figure 7:
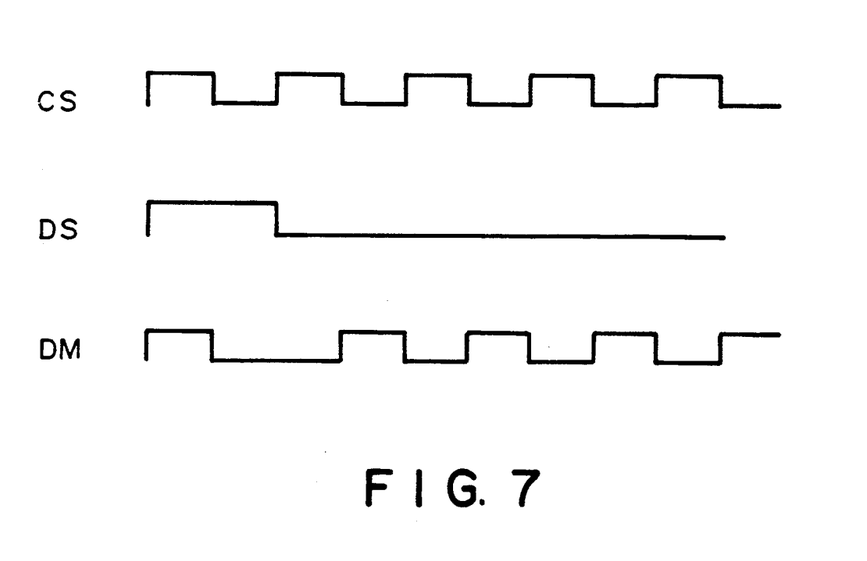
FIG. 7 is a diagram showing a set of signals for driving a liquid crystal cell according to the present invention.
Figure 8:
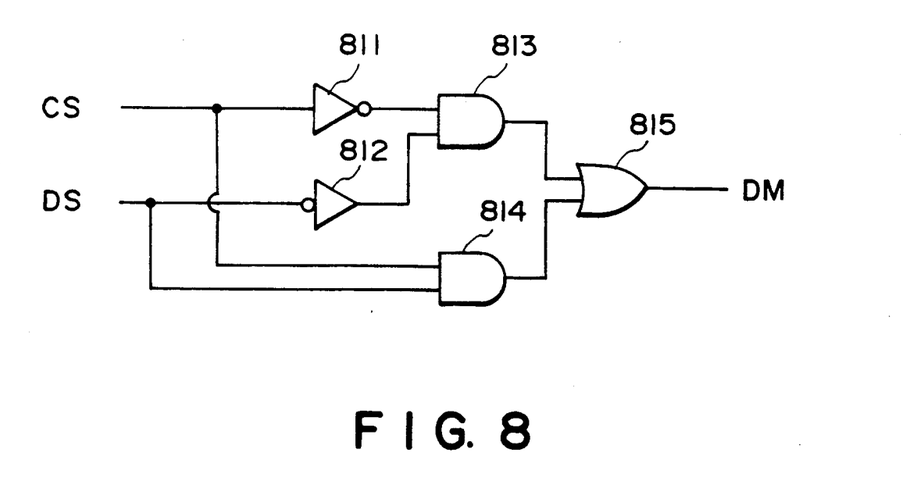
FIG. 8 is a block diagram showing a data modulator for outputting the signals shown in FIG. 7.

FIG. 7 shows an example of such a signal outputted from the data modulator. Further, FIG. 8 shows a circuit formation of the data modulator for outputting the signal shown in FIG. 7, which includes two inverters 811 and 812, two AND circuits 813 and 814 and an OR circuit 815.

A structure similar to the above-described liquid crystal display apparatus can be used as a liquid crystal shutter array in an image recording apparatus.

Figure 9:
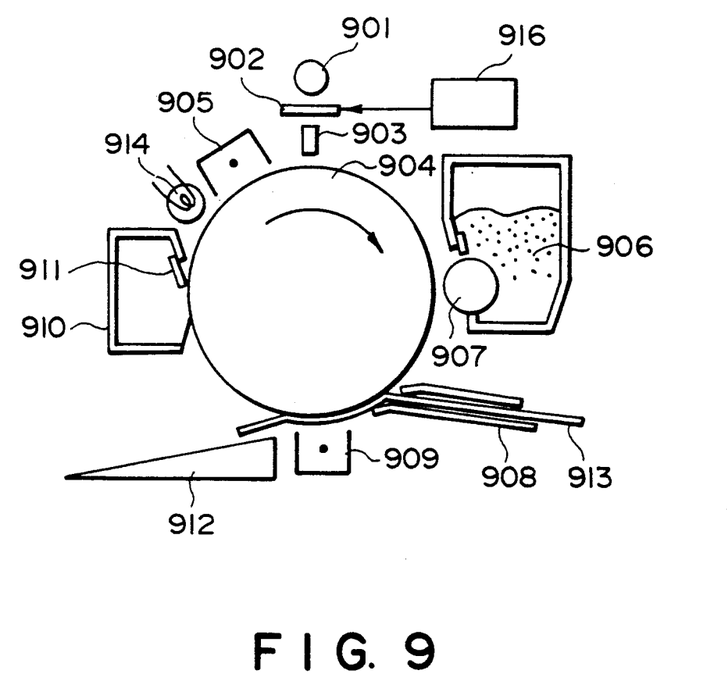
FIG. 9 is a schematic view of an example of a recording apparatus to which a liquid crystal cell according to the present invention is applied.
Figure 10:
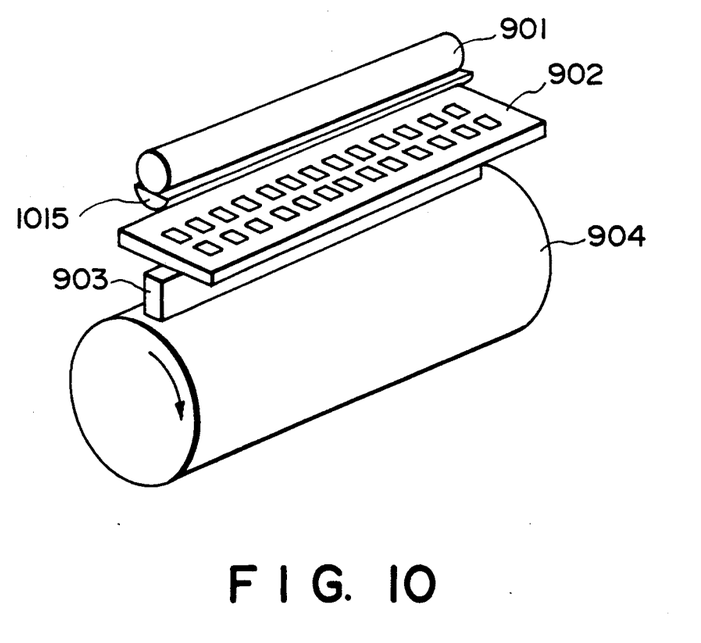
FIG. 10 is a perspective view showing essential parts of the recording apparatus.

FIG. 9 illustrates an electrophotographic image recording apparatus in which such a liquid crystal shutter array is used for modulating and controlling light-exposure of a photosensitive member. Referring to FIG. 9, the image recording apparatus includes an exposure lamp 901 as a light source, a liquid crystal shutter array 902, an array of short-focus image formation elements 903, a photosensitive drum 904, an electric charger 905, a developing device 906, a developing sleeve 907, a transfer guide 908, a transfer charger 909, a cleaning device 910, a cleaning blade 911, and a conveyer guide 912. In operation, the photosensitive drum 904 rotating in the direction of an arrow as shown is charged by means of an electric charger 905 and then exposed to modulated light depending on image signals to form an electrostatic latent image. Optical modulation for producing the modulated light is performed, as shown in FIG. 10, by transmitting or interrupting light from the exposure lamp 901 by means of the liquid crystal shutter array 902 arranged in parallel with the axis of the photosensitive drum 904. In the liquid crystal shutter array, a large number of liquid crystal shutter elements (pixels) are arranged in a staggered fashion so as to increase the arrangement density of the shutter elements. A rod lens 1015 may be used as desired for condensing the light from the exposure lamp 901 onto the liquid crystal shutter array 902.

The thus formed electrostatic latent image is developed by attachment of a charged toner on the developing sleeve 907. The toner image thus formed on the photosensitive drum 904 is transferred to a transfer paper 913 supplied from a paper-supplying cassette (not shown) under discharge from the backside of the transfer paper 913 by the transfer charger 909, and the transferred toner image on the transfer paper 913 is conveyed by the conveyer means 912 to a fixing device (not shown) and fixed thereat onto the transfer paper 913. On the other hand, a portion of the toner remaining on the photosensitive drum 904 without being transferred is scraped off the drum surface by the cleaning blade 911 to be recovered in the cleaning device 910. The charge remaining on the photosensitive drum is extinguished by illumination from a pre-exposure lamp 914.

As described above, according to the present invention, a one-pack type thermosetting epoxy adhesive is used as a sealant for a liquid crystal cell after modification with an amine-type room temperature hardener preferentially with respect to its low-molecular weight fraction, whereby it becomes possible to introduce a particulate adhesive in a display area while avoiding a flow of the sealant and also the sealant can be printed continuously for an extended time.

As a result, it becomes possible to stably provide a liquid crystal cell of a large area with a uniform and a highly accurate gap. Accordingly, by using the liquid crystal cell according to the present invention in a display apparatus or a recording apparatus, it is possible to improve the quality or function of display or recording and also possible to increase the productivity of these apparatus.

What is claimed is:

1. A sealant for a liquid crystal cell wherein a pair of oppositely disposed electrode plates are bonded to each other with the sealant to define a space to be filled with a liquid crystal, comprising a one-pack type thermosetting epoxy adhesive containing a potential hardener activatable at an elevated temperature, and an amine-type room temperature hardener modifying the epoxy adhesive added in a proportion of 1.0-3.0 wt. % of the total of the epoxy adhesive and the amine-type room temperature hardener.

2. A sealant according to claim 1, wherein the amine-type room temperature hardener is added in a proportion of 1.8-3.0 wt. % of the total of the epoxy adhesive and the amine-type room temperature hardener.

3. A sealant according to claim 2, wherein said one-pack type thermosetting epoxy adhesive comprises an epoxy-resin and the potential hardener, and said amine-type room temperature hardener is added in a proportion of 0.2-0.8 equivalent for one equivalent of the epoxy resin in the epoxy adhesive.

4. A sealant according to claim 3, wherein said amine-type room temperature hardener is added in a proportion of 0.25-0.5 equivalent for one equivalent of the epoxy resin in the epoxy adhesive.

5. A sealant according to claim 1, wherein said one-pack type thermosetting epoxy adhesive comprises an epoxy resin and the potential hardener, and said amine-type room temperature hardener is added in a proportion of 0.2-0.8 equivalent for one equivalent of the epoxy resin in the epoxy adhesive.

6. A sealant according to claim 5, wherein said amine-type room temperature hardener is added in a proportion of 0.2-0.8 equivalent for one equivalent of the epoxy resin in the epoxy adhesive.

7. A sealant for a liquid crystal cell wherein a pair of oppositely disposed electrode plates are bonded to each other with the sealant to define a space to be filled with a liquid crystal, comprising a one-pack type thermosetting epoxy adhesive comprising an epoxy-resin and a potential hardener activatable at an elevated temperature, and an amine-type room temperature hardener modifying the epoxy adhesive added in a proportion of 0.2-0.8 equivalent for one equivalent of the epoxy resin in the epoxy adhesive.

8. A sealant according to claim 7, wherein said amine-type room temperature hardener is added in a proportion of 0.25-0.5 equivalent for one equivalent of the epoxy resin in the epoxy adhesive.

9. A sealant, comprising an epoxy resin, a hydrazide compound, a filler, and an amine-type room temperature hardener, said amine-type room temperature hardener being present in a proportion of 1.0-3.0 wt. % of the total of the epoxy resin, the hydrazide compound and the amine-type room temperature hardener.

10. A liquid crystal cell, comprising a pair of oppositely disposed electrode plates having a sealant bonding the electrode plates to define a space, and a liquid crystal filling the space, wherein the sealant is a cure product of a one-pack type thermosetting epoxy adhesive containing a potential hardener activatable at an elevated temperature, said sealant further comprising an amine-type room temperature hardener added in a proportion of 1.0-3.0 wt. % of the total of the epoxy adhesive and the amine-type room temperature hardener.

11. A liquid crystal cell according to claim 10, which further comprises a particulate adhesive disposed in the space and bonding the electrode plates.

12. A display apparatus, comprising: a liquid crystal cell, a clock signal generator, a scanning electrode selector, a scanning electrode driver, a data generator, a data modulator and a signal electrode driver; wherein said liquid crystal comprises a pair of oppositely disposed electrode plates having a sealant bonding the electrode plates to define a space, and a liquid crystal filling the space, wherein the sealant is a cured product of a one-pack type thermosetting epoxy adhesive containing a potential hardener activatable at an elevated temperature, said sealant further comprising an amine-type room temperature hardener added in a proportion of 1.0-3.0 wt. % of the total of the epoxy adhesive and the amine-type room temperature hardener.

13. A recording apparatus, comprising:
 a liquid crystal shutter array including a liquid crystal cell, a clock signal generator, a scanning electrode selector, a scanning electrode driver, a data generator, a data modulator and a signal electrode driver;
 a light source;
 a photosensitive member; and
 a developing device;

wherein said liquid crystal cell comprises a pair of oppositely disposed electrode plates having a sealant bonding the electrode plates to define a space, and a liquid crystal filling the space, wherein the sealant is a cured product of a one-pack type thermosetting epoxy adhesive containing a potential hardener activatable at an elevated temperature, said sealant further comprising an amine-type room temperature hardener added in a proportion of 1.0–3.0 wt. % of the total of the epoxy adhesive and the amine-type room temperature hardener.

* * * * *

UNITED STATES PATENT AND TRADEMARK OFFICE
CERTIFICATE OF CORRECTION

PATENT NO. : 5,150,239
DATED : September 22, 1992
INVENTOR(S) : YASUYUKI WATANABE, ET AL.

It is certified that error appears in the above-identified patent and that said Letters Patent is hereby corrected as shown below:

<u>COLUMN 1</u>

Line 51, "lacked," should read --lacking,--.

<u>COLUMN 2</u>

Line 20, "bonding" should read --bonding.--.
Line 47, "filed" should read --filled--.

<u>COLUMN 8</u>

Line 34, "invention" should read --invention.--.

<u>COLUMN 10</u>

Line 36, "cure" should read --cured--.

Signed and Sealed this

Sixteenth Day of November, 1993

Attest:

BRUCE LEHMAN

Attesting Officer     Commissioner of Patents and Trademarks